(12) United States Patent
Nommensen

(10) Patent No.: US 6,195,992 B1
(45) Date of Patent: Mar. 6, 2001

(54) STIRLING CYCLE ENGINE

(76) Inventor: Arthur Charles Nommensen, 16 Wendell St., Norman Park, Queensland 4170 (AU)

( * ) Notice: Subject to any disclaimer, the term of this patent is extended or adjusted under 35 U.S.C. 154(b) by 0 days.

(21) Appl. No.: 09/488,288

(22) Filed: Jan. 20, 2000

(30) Foreign Application Priority Data

Jan. 21, 1999 (AU) .................................................. PP8274

(51) Int. Cl.$^7$ ...................................................... F01B 29/10
(52) U.S. Cl. .............................................. 60/519; 60/525
(58) Field of Search ............................... 60/517, 519, 526, 60/518, 525

(56) References Cited

U.S. PATENT DOCUMENTS

| 3,370,418 | * | 2/1968 | Kelly | 60/519 |
| 4,753,073 | * | 6/1988 | Chandler | 60/519 |
| 5,076,058 | * | 12/1991 | Emigh et al. | 60/525 |

FOREIGN PATENT DOCUMENTS

| 001612102 | * | 12/1990 | (SU) | 60/519 |

OTHER PUBLICATIONS

Koichi Hirata, Structure of Stirling Engines, pp. 1–2, Jul. 13, 1998.
Koichi Hirata, Rotary Displacer Type Stirling Engine, p. 2, Jul. 13, 1998.
Koichi Hirata, History of Stirling Engines No. 4, p. 1, Jul. 13, 1998.
Koichi Hirata, Rotary Displacer Type Stirling Engine, p. 1, Jul. 13, 1998.

* cited by examiner

Primary Examiner—Hoang Nguyen
(74) Attorney, Agent, or Firm—Renner, Otto, Boisselle & Sklar LLP

(57) ABSTRACT

A Stirling cycle engine having two chambers (formed by 12–14, or 12, 15 and 16) containing a working fluid and rotatable rotor disks (10, 11) coupled to a common output power shaft (3). Each chamber has a hot zone and a cold zone, and a passage (23) leads from the hot zone in one chamber to the cold zone in the other chamber and a passage (24) leads from the hot zone in the other chamber to the cold zone in the one chamber. Each rotor disk (10, 11) has a displacer section (5) for displacing the working fluid and a turbine section (6) having turbine blades (7) arranged along its periphery. The disks (10, 11) rotate out of phase with each other and working fluid from the respective passages (23, 24) is directed to the blades (7) to rotate the disks (10, 11) when engine is in operation.

11 Claims, 9 Drawing Sheets

STIRLING CYCLE ENGINE

FIELD OF INVENTION

This invention relates to a Stirling cycle engine.

BACKGROUND OF THE INVENTION

Stirling cycle engines, historically known as "hot air engines", have been developed for cars, buses and industrial applications. Their development, despite their promise of superbly high energy efficiency and low pollutant release, has not met with significant commercial success. This has largely come about because complex pressure seals are needed to contain high pressure gas at high temperature on sliding (reciprocating) shafts. At this time they have found application as engines only in exotic special areas, such as in non-nuclear submarines and in miniature form as cryogenic coolers, eg. for Hubble space telescope electronics. Their theoretic advantage is such that a solution to their heretofore problems would literally change the world energy scenario.

Typically, Stirling engine forms have involved a reciprocating "gas volume displacer" which merely moves a bulk of contained gas back and forth between a hot (externally heated) and a cold (externally cooled) end of an enclosed (usually cylindrical) chamber. This action causes the pressure in the chamber to rise and fall, and the rise and fall of pressure produces power output in an associated power piston. An alternative form of the engine uses multiple, combined power/displacer reciprocating pistons, to effect the volumetric movement of the gas between heated and cooled cylinder heads, and to extract power.

In all apparent known forms of the engine, including multi-cylinder engines with combined power/displacer pistons, crank style mechanisms effect the movement of the displacer and power pistons. These crank or crank-equivalent mechanisms have the property of a near sinusoidal reciprocating motion. This form of motion is utilized advantageously in known forms to cause one element (say the displacer), to have a low or zero motion at one portion of the stroke while the other element (say, the power piston) is moving at high speed. This approximately 90° out-of-phase action is essential to the known principles and forms of the Stirling cycle.

The known principles of the Stirling cycle engine are such that efficiencies and power rise as the contained fluid pressure rises and the temperature between the hot and cold ends rises. Therefore, useful engines favour the use of quite high internal pressures even to 100 atmospheres and hot-end temperatures of 550° C. are routinely used. When such extreme conditions are coupled to the need for non-lubricated reciprocating parts, bearing and seals to contain the power fluid, the need for "cross-heads" or other complex crank mechanisms such as rhombic gear drives to maintain the close tolerance reciprocating seal parts in alignment, then the complexity and the need for sophisticated materials of construction will be readily appreciated. Because the geometry of cylinders tend to minimize external surface (available for heat transfer), compared to the internal working fluid volume, existing known forms of the engine must use complex "nests" of external heater/cooler and heat regenerator tubes, and even then power is usually limited by heat transfer difficulties.

A further practical difficulty has beset the commercialization of the Stirling cycle engine, namely power control. In (say) a gasoline engine, when throttle is adjusted, the change in power output of the engine is almost instantaneous. In a Stirling cycle engine however, adjusting the burner throttle does not instantaneously reduce the temperature of the hot metal mass comprising heat transfer surfaces, so the power change of the engine lags severely. Very complex mechanical schemes have been required in known reciprocating forms of the engine to overcome these effects.

All these complexities have been the barrier to successful commercial application of the known forms of the Stirling cycle engine.

SUMMARY OF THE INVENTION

It is an object of the present invention to provide a Stirling cycle engine which at least minimizes some of these disadvantages.

According to one aspect of the invention there is provided a Stirling cycle engine having:

at least two chambers for containing a working fluid, each said chamber having a hot zone and a cold zone;

at least one passage between the hot zone in one chamber and the cold zone in the other chamber and at least one passage between the hot zone in the other chamber and the cold zone in the one chamber;

a rotor disk in each of the chambers, said disk having a displacer section for displacing the working fluid and a turbine section having turbine blades arranged along its periphery; and an output power shaft to which said disks are mounted for rotation within the chambers, wherein the disk in one chamber rotates out of phase with the disk in the other chamber and working fluid from the respective passages may be directed to the blades to rotate the disks within the chambers.

Preferably, each chamber has a diskoidal-shaped housing and the hot and cold zones correspond to upper and lower hemispheres of the chambers.

The hot and cold zones of the chambers may be established by passaging externally heated and cooled fluids to outside faces of the housings.

At least one inside face of each housing may have projections which increase the surface area for heat transfer with the working fluid but which also allow the disks to rotate freely within the chambers.

Each displacer section may have an open-angle of at least 120 degrees, which may be varied in order to regulate engine power output.

Preferably, the disks are radially displaced relative to one another at a phase difference of about 180 degrees for optimal engine power output.

The passages may have adjustable one-way flow valves and or adjustable nozzles for regulating the flow of the working fluid between the chambers, for regulating engine power output.

The engine may be adjustably connected to a reservoir of pressurized fluid for pressurizing and starting the engine, and for regulating engine power output.

Preferably, the working fluid is a gas of high mass density and of low specific heat and viscosity.

Each chamber may have additional passages for communicating the working fluid between the hot zone and the cold zone of that chamber, for optimizing heat transfer and for improving engine power output.

BRIEF DESCRIPTION OF THE DRAWINGS

Particular preferred aspects of the invention will now be described by way of example with reference to the drawings in which.

DETAILED DESCRIPTION OF THE PREFERRED EMBODIMENT

In all of the figures like numerals refer to like parts.

Figure 1A:
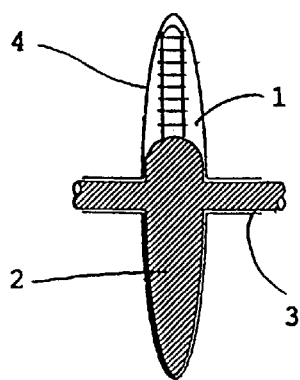
FIGS. 1a, 1b and 1c are diagrammatic front elevational views of chambers containing rotor disks according to an embodiment of the invention.
Figure 1B:
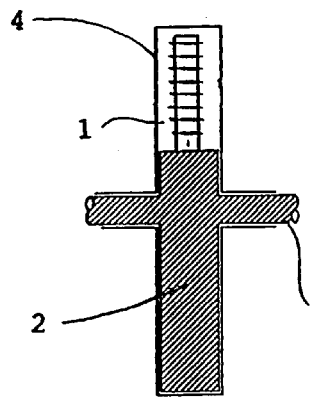
Figure 1C:
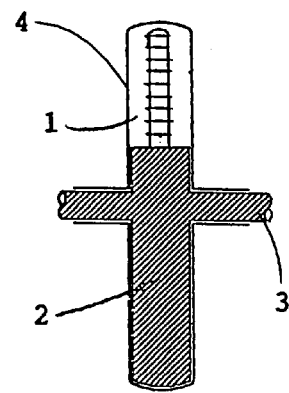
Figure 2:
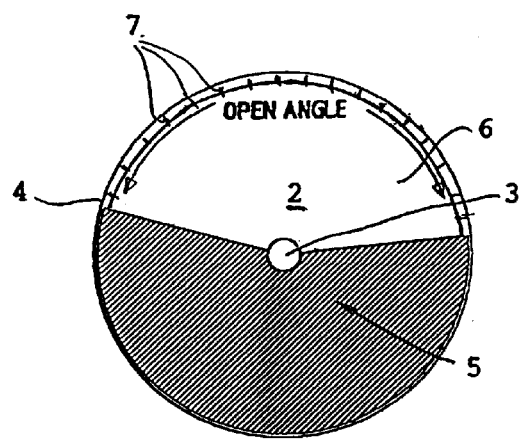
FIG. 2 is an end elevational view of the chamber and rotor disk of FIG. 1b.

FIG. 1 shows diagrammatically different types of chambers 1 for a Stirling cycle engine of the present invention. Each chamber 1 contains a rotatable rotor disk 2 and these disks are coupled to a common output power shaft 3. FIG. 2 is a side view of the chamber 1 of FIG. 1b.

Each chamber 1 has a diskoid-shaped housing 4, one hemisphere of which is heated to form a hot zone and another hemisphere of which is cooled to form a cold zone. Each disk 2 has a displacer section 5 for displacing working fluid within the chamber 1 and a turbine section 6 that has a plurality of turbine blades 7 along its periphery. The turbine blades may consist of "impulse" (static nozzles and pelton wheels) or reaction turbine type blades. For perfect rotational balance of the engine, the weight of the blades 7 may counterbalance the weight of the displacer section 5. The configuration of the disk 2 and chamber 1 is a departure from conventional Stirling cycle engines having either a reciprocating cylinder form with a separate power piston or a rotating cylindrical form with a separate power piston.

In a Stirling cycle engine according to the present invention a plurality of such disks 2 and chambers 1 are present. Preferably, the disks 2 are present in pairs and any number of pairs of such elements may be present. The diskoid-shaped housing 4 efficiently separates the heated hemisphere from the cooled hemisphere and provides a large area for heat transfer with the working fluid as compared to other types of Stirling cycle engines. Seals and bearings required are rotational only. The seals and bearings required with such an engine operate in a cool-running axial zone of the chambers. This engine design allows for repeated identical housing sub-components to be machined or stamped out from sheet alloy material or even cast from ceramics. The resultant size of an engine with such a configuration is relatively compact. With such a configuration, the effectiveness of the geometry rises to a maximum and then decreases with increased disk diameter for a given volume.

Figure 3:
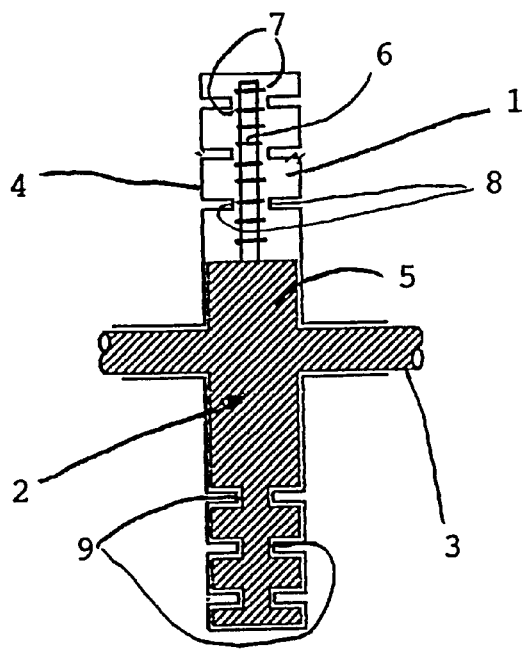
FIG. 3 is a front elevational view of a chamber containing a rotor disk according to another embodiment of the invention.

FIG. 3 shows further details of the disk 2 and chamber 1. Concentric rings or segments of concentric rings (fins) 8 project from one or both (as shown) opposing inside faces of the chamber housing 4. The displacer section 5 of the disk is thicker than the turbine section 6 and has concentric circular grooves 9 on one or both opposing faces (as shown) for receiving the fins 8 such that the rotation of the disk 2 at close tolerances is not impeded and such that fluid is largely excluded between the displacer section 5 and the housing 4. Heat transfer between the heated and cooled hemispheres of the housing 4 and the working fluid is significantly improved by the extended surface area provided by the fins 8. The fins 8 may be easily machined when circular in form.

Figure 4:
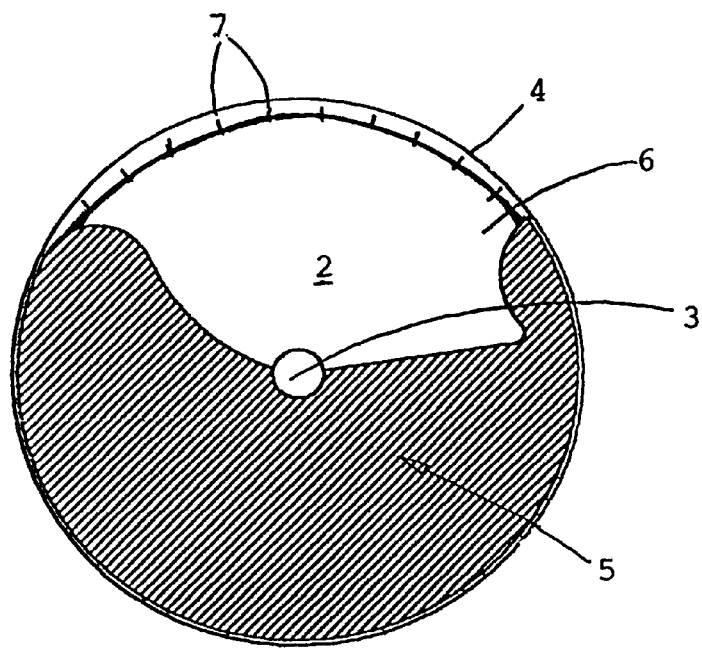
FIG. 4 is an end elevational view of a chamber containing a rotor disk according to another embodiment of the invention.

The size and shape of the displacer section 5 of the disk 2 may be altered to favourably effect the "dwell angle" of pressure pulses within the chamber 1. Heat transfer may further be assisted by changing the shape of the displacer section 5 which provides for fluid-recirculation to outer regions of the section 5. Dwell angle may be changed from sinusoidal form when the section 5 is semicircular in shape to a near square wave form when the section 5 is shaped as shown in FIG. 4. The displacer section may be "tuned" to the most effective heat transfer regions of a given engine chamber to maximize power output.

The efficiency and power output of an engine can be adjusted by changing the open-angle of the displacer section from about 120 degrees to an open-angle exceeding 180 degrees (see FIG. 2). This is similar to varying the design phase angle between displacer and power pistons in conventional Stirling cycle engines. For engines of the present invention having more than two rotor disks, it is also feasible to adjust the designed phase angle of the disk to shaft orientation between interacting disks to modulate engine power output.

Figure 5:
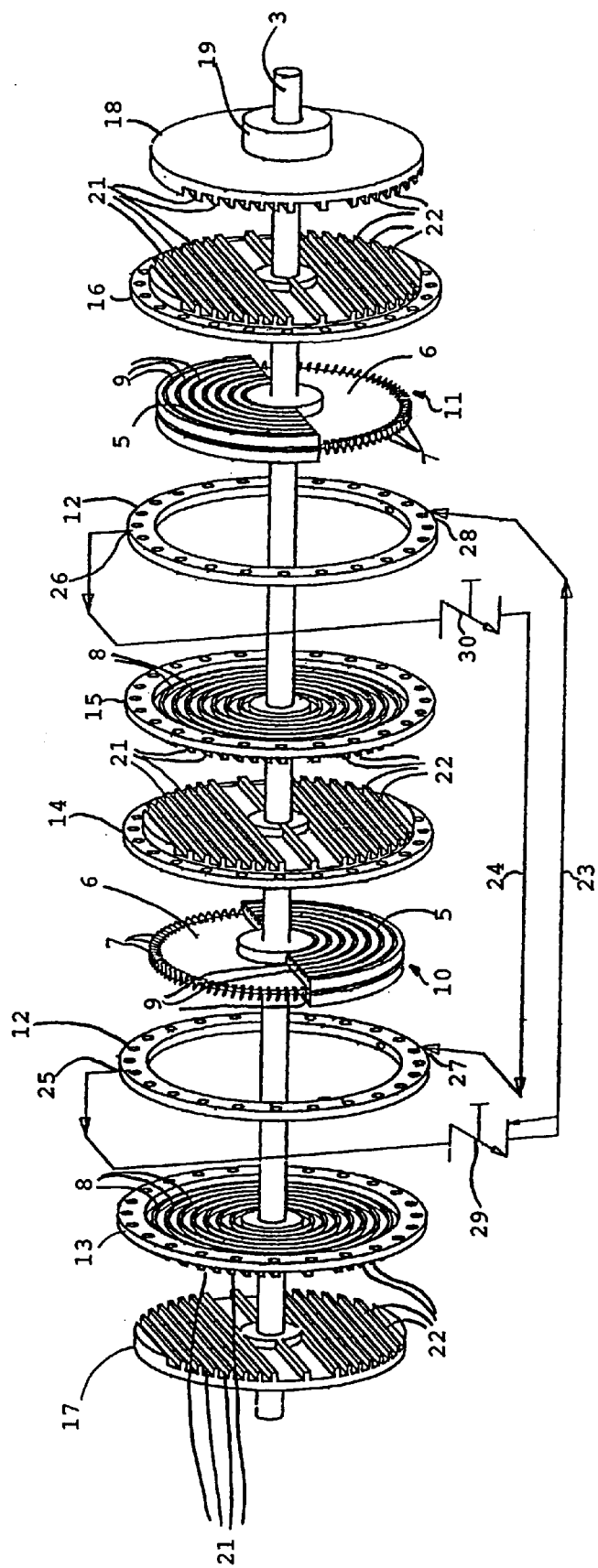
FIG. 5 is an exploded view of a Stirling cycle engine according to an embodiment of the invention.

FIG. 5 shows an exploded view of a Stirling cycle engine having two rotor disks 10, 11 according to an embodiment of the invention. Each disk 10, 11 has a grooved displacer section 5 and a comparatively thinner turbine section 6 with blades 7, and the disks 10, 11 are coupled to a single output shaft 3. Each disk 10, 11 rotates within a chamber housing formed by a spacing ring 12 between inner heat transfer casings 13 and 14 or 15 and 16. The displacer section 5 of each disk 10, 11 has concentrically arranged grooves 9 that receive concentrically arranged fins 8 from adjacent surfaces of inner heat transfer casings 13, 14, 15 and 16. Inner heat transfer casings 13 and 16 are flanked by outer heat transfer plates 17 and 18. Each of the outer plates 17, 18 has a hub 19 through which extends the output shaft 3.

Figure 6:
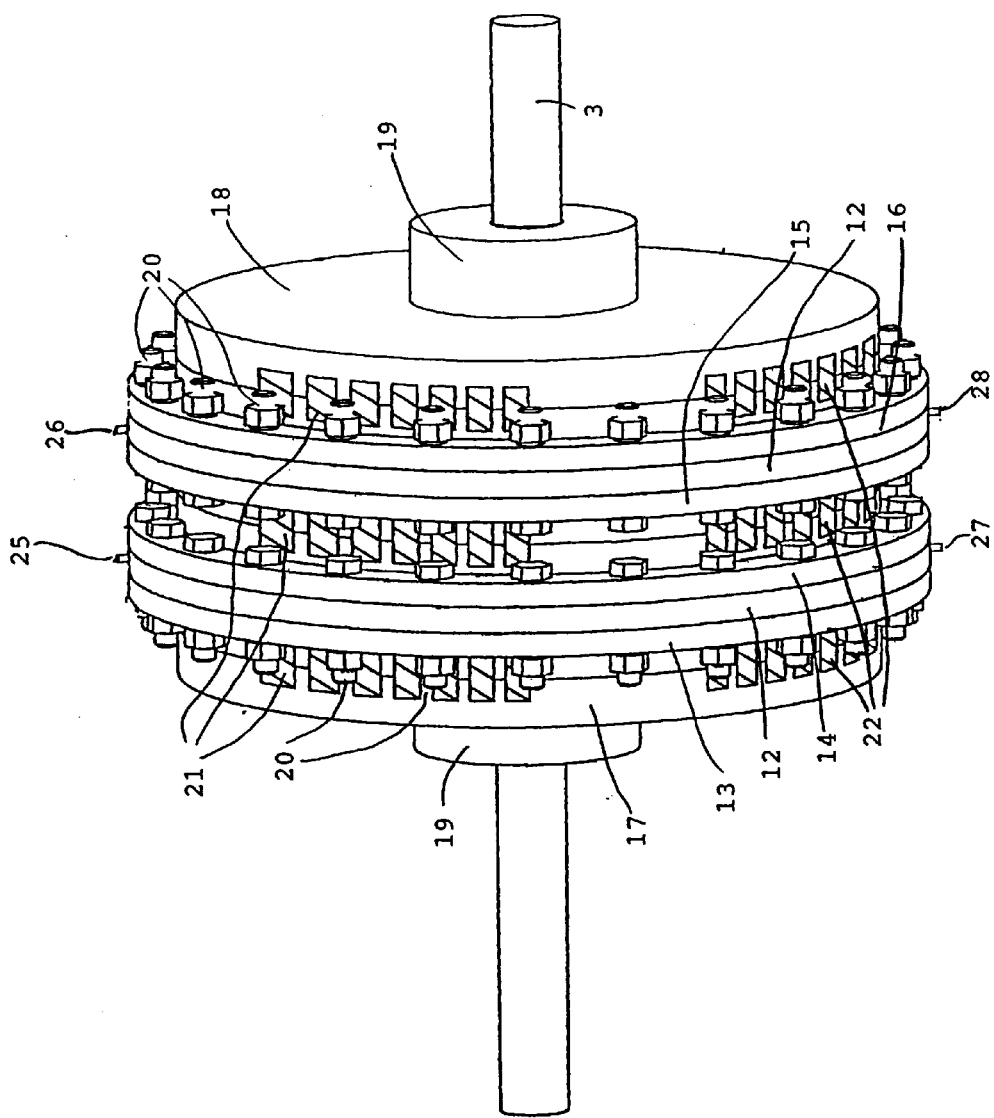
FIG. 6 is a view of the engine of FIG. 5 but showing greater detail.

FIG. 6 shows the Stirling cycle engine of FIG. 5 in an assembled form. Fasteners 20 hold the engine together.

As shown in FIGS. 5 and 6, plates 17 and 18 and casings 13–16 each have a surface which is corrugated in appearance. When these plates and casings are paired as indicated, upper passages 21 for hot fluid for heating the working fluid and lower passages 22 for cold fluid for cooling the working fluid are provided. Each of the paired casings/plates provide passages for hot and cold fluid on one side of each disk 10, 11.

As shown in FIG. 5, the disks 10, 11 are radially displaced relative to one another at a phase difference of about 180 degrees. The phase difference may be between 120 to 240 degrees.

Figure 7:
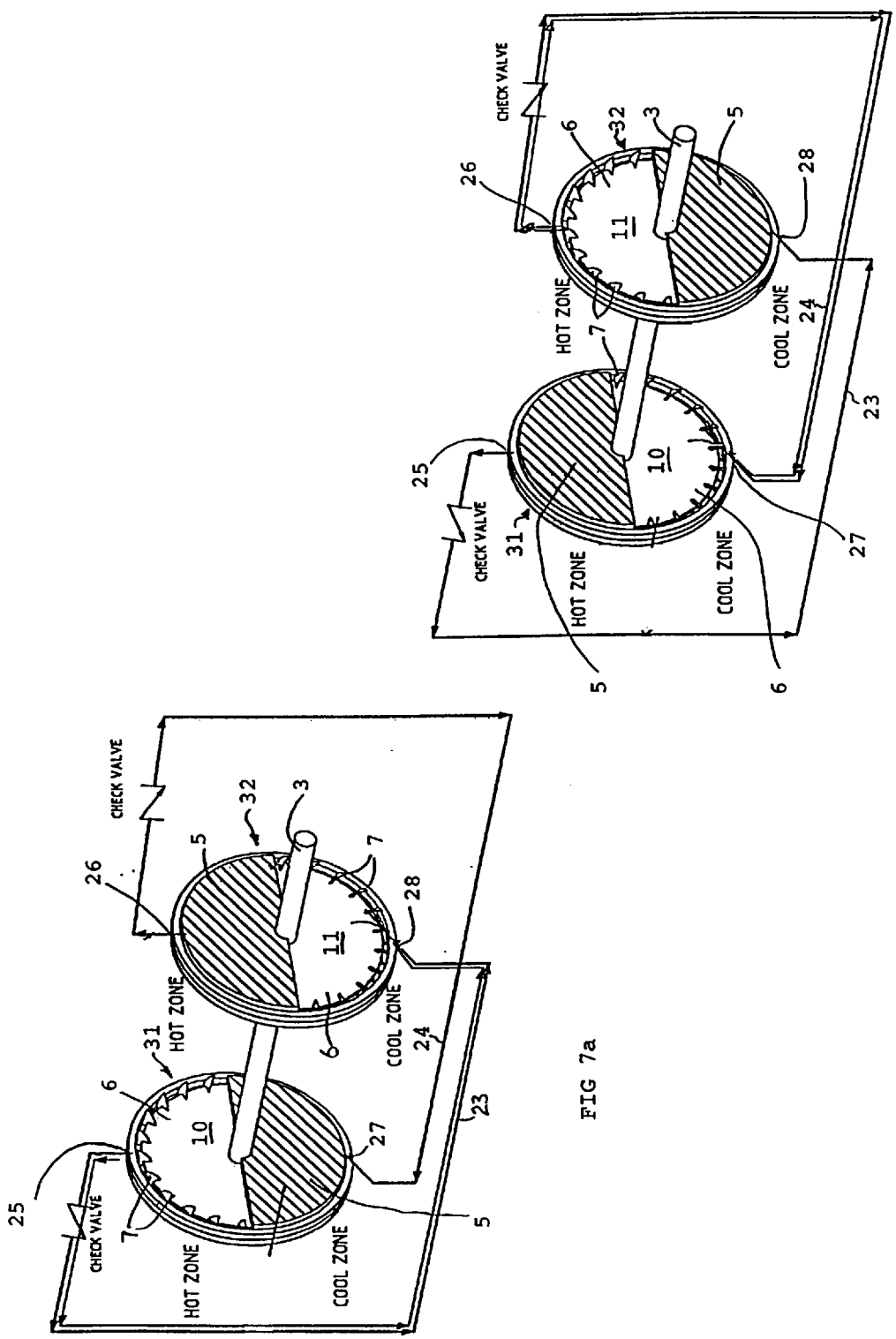
FIGS. 7a and 7b are views useful in understanding the operation of the engine according to an embodiment of the invention.

Referring now to FIGS. 5 and 7, a conduit 23 couples the hot zone of the chamber containing disk 10 to the cold zone of the chamber containing disk 11 and another conduit 24 couples the hot zone of the chamber containing disk 11 to the cold zone of the chamber containing disk 10. With this arrangement, when rotating disk 10 is at its high pressure phase working fluid will flow from this chamber to the other chamber where the disk 11 is at its low pressure phase. Fluid will flow at high velocity from one chamber to the other and this flow can drive the disks 10, 11 via the turbine blades 7, with uni-directional rotation resulting from bi-directional fluid flow. In this way, each of the paired disks 10, 11 becomes both a displacer of heated/cooled fluid and a turbine power output wheel. As indicated by FIGS. 5 and 6, conduits 23 and 24 are coupled by nozzles 25–28 to the spacing ring 12 of each chamber.

FIGS. 7a and 7b show the fluid flow arrangement just described. Working fluid exits from nozzle 25 at the hot zone of chamber 31 and is directed through nozzle 28 into the cold zone of chamber 32 to drive disk 11 via the turbine blades 7. When the turbine section 6 of the disk 11 rotates into the hot zone, fluid escapes through nozzle 26 and is injected into chamber 31 through nozzle 27 and onto the blades 7 of disk 10.

Figure 8:
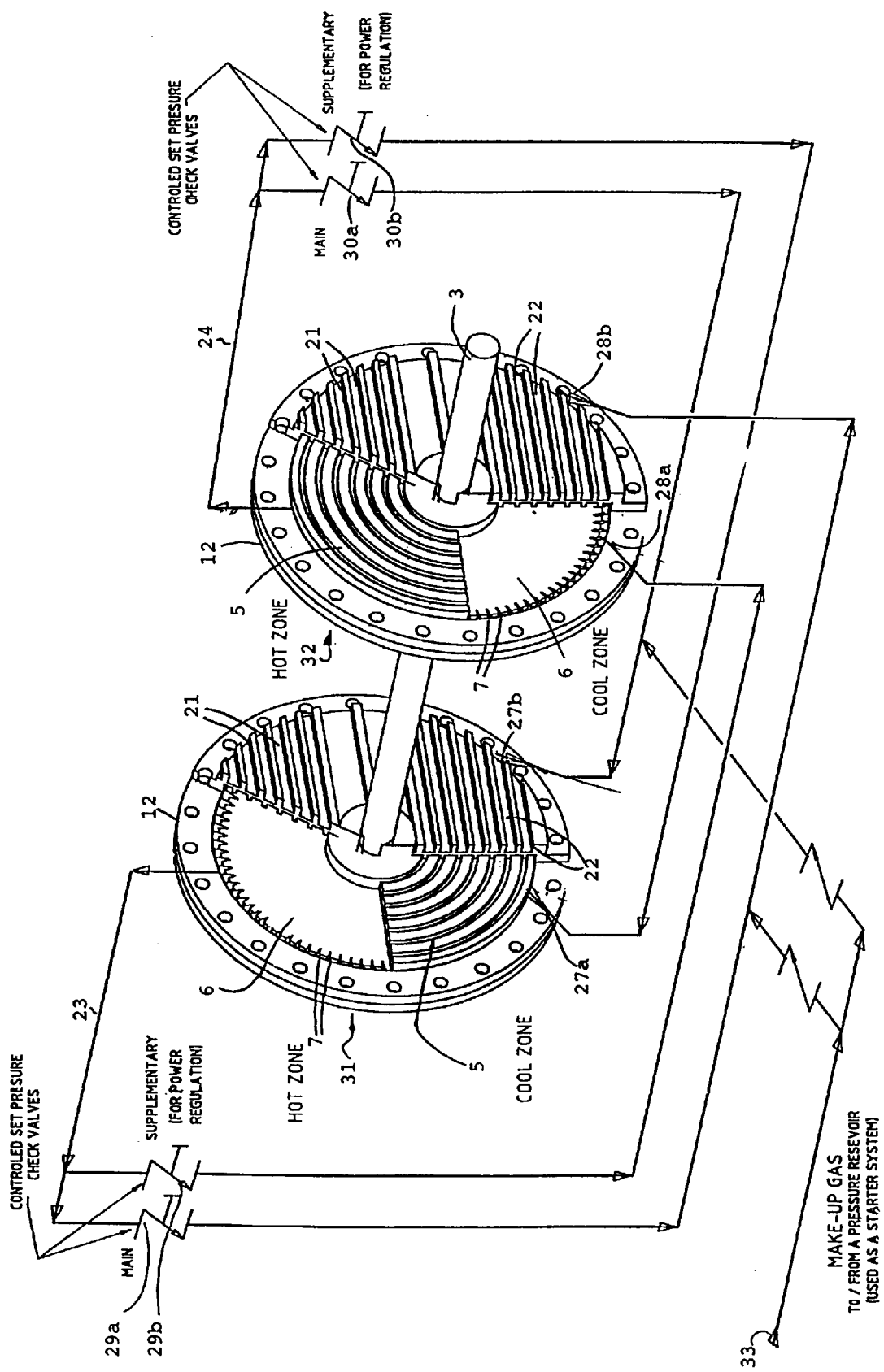
FIG. 8 is a perspective diagrammatic view of a Stirling cycle engine according to an embodiment of the invention.

Referring to FIG. 5, conduits 23 and 24 have one-way valves 29, 30 and nozzles 25–28 that may be adjusted to regulate the flow of fluid between the chambers. FIG. 8 shows an embodiment of the invention much like FIGS. 5 and 7 except the cold zone of each chamber 31, 32 is provided with additional regulatory inlet nozzles 27a, 27b, 28a, 28b and one-way flow valves 29a, 29b, 30a, 30b. Regulating the flow of fluid between the chambers can affect the output power and revolution per minute (RPM) of the Stirling cycle engine, and an appropriate configuration of nozzles may even in effect brake the engine.

At start up of an engine of the present invention, pressurized fluid in a reservoir may be used to initially start engine rotation whilst at the same time pressurizing the engine to full internal operating pressure. This is required as Sterling cycle engines are not self-starting. As shown in FIG. 8, fluid from the reservoir 33 enters the chambers 31, 32 through nozzles 28b and 27b at high velocity to impact on the blades 7 thus causing the initial (starting) rotation of the disks.

A small shaft driven compressor may be incorporated into the engine such that during run-down and cool-down phase of the engine after power operation has been terminated and the engine returns to idle, the compressor may function to return pressurized gas from the engine to the reservoir. This would relieve pressure of the seals when the engine is not in use and the reservoir would be recharged for use in subsequent re-starting and re-pressurizing of the engine. In addition, the fluid reservoir may be used to control output power and RPM of the engine by adjusting the fluid pressure within the chambers.

Although any suitable fluid may be used, it is preferred that the engine of the invention employs gas of high mass density but with reasonably low specific heat and viscosity. A gas like hydrogen bromide, with a molecular weight 20 times higher than helium and with similar viscosity and molar specific heat to helium, would yield more power. Silicon fluoride, with a molecular weight 26 times higher than helium may similarly be a better choice than helium for use with the engine of the present invention.

Figure 9:
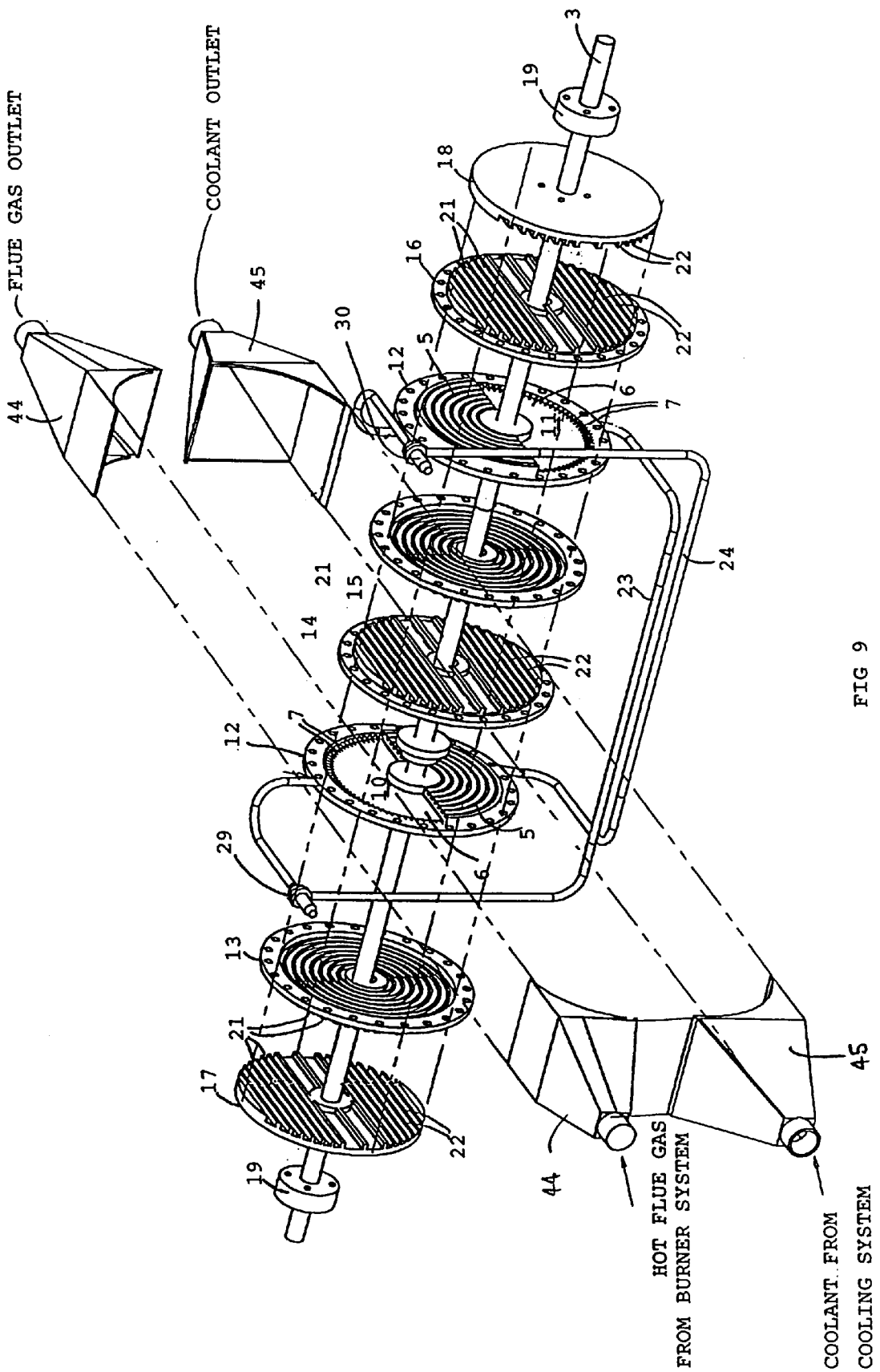
FIG. 9 is an exploded perspective view of a Stirling cycle engine according to an embodiment of the invention.
Figure 10:
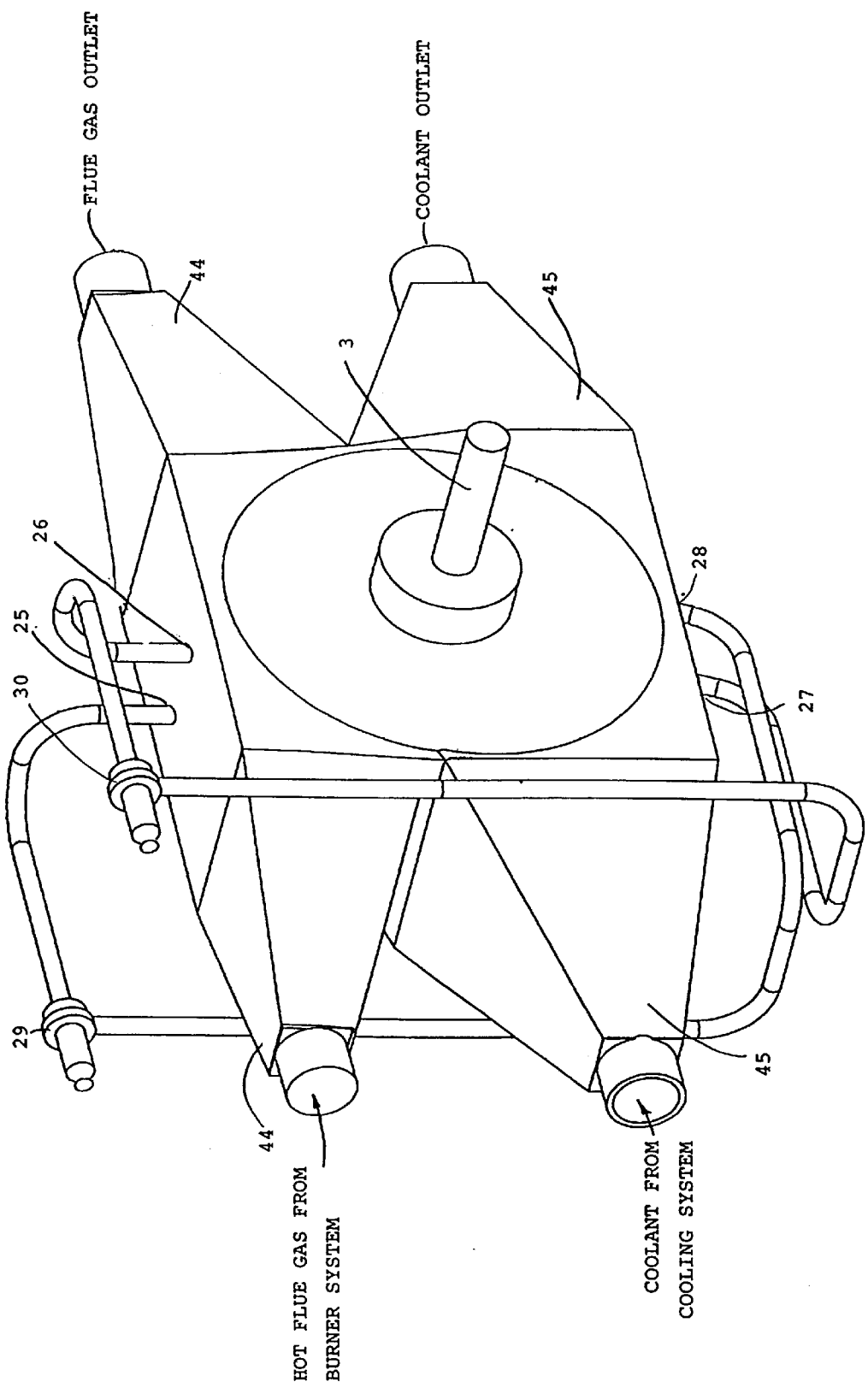
FIG. 10 is a perspective view of the engine of FIG. 9.

FIGS. 9 and 10 illustrate how the engine components of FIG. 5 come together to form the complete entity, excluding external ancillaries such as burners, coolant pumps and controls, according to an embodiment of the invention.

Before the engine is started an external heating system such as an oil-fired burner is put into operation and high temperature fluid such as oil-fired burner flue gas is ducted through manifold 44 and upper passages 21. An external cooling system such as a reservoir of cold water is put into operation to direct coolant through manifold 45 and into lower passages 22. Coolant is also by external means caused to flow to central gas seal and shaft rotation bearings regions of the hubs and also to the output shaft (not shown). In this way, the hot hemispheres of the chambers will become heated to high temperatures and maintained at high temperatures, and the cooled hemispheres as well as seals and bearings will become cool and be maintained cool during the operation of the engine.

In another embodiment of the invention, the open-face surface of the displacer section may be modified in design to cause dynamic pressure differentials. Contouring of the open face can be such that "leading edge" (with respect to rotation) versus "trailing edge" pressure differentials can be created by the rotation of the disk. These pressure differentials may be sufficient to force some of the working fluid to flow in a reciprocating manner through external tubes which connect the hot and cold zones of a chamber thus further increasing the heat transfer area available for heating and cooling the chamber-contained fluid, and thus further allowing for improved heat transfer efficiency for engines of higher power styles.

Figure 11:
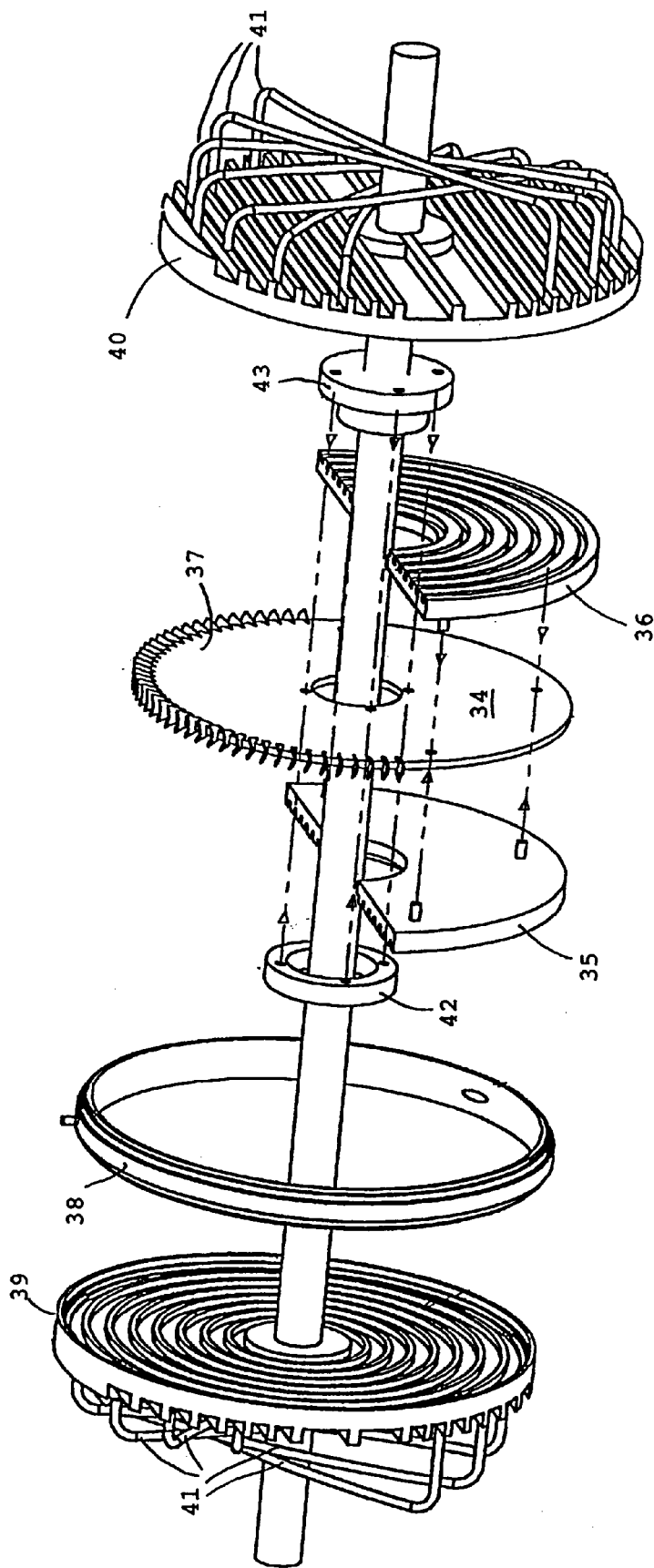
FIG. 11 is an exploded perspective view of part of a Stirling cycle engine according to another embodiment of the invention.

FIG. 11 shows an exploded view of such an embodiment. The rotor disk is formed from two semicircular grooved plates 35, 36 clamped between bosses 42 and 43 to a central disk 34 having the turbine section 37, and the chamber housing comprises an inner ring 38 and two inner heat transfer casings 39, 40. Each inner heat transfer casing 39, 40 has a plurality of heater/cooler/regenerator tubes 41 for communicating working fluid between the hot zone and the cold zone of the chamber.

What is claimed is:

1. A Stirling cycle engine having:
    at least two chambers for containing a working fluid, each said chamber having a hot zone and a cold zone;
    at least one passage between the hot zone in one chamber and the cold zone in the other chamber and at least one passage between the hot zone in the other chamber and the cold zone in the one chamber;
    a rotor disk in each of the chambers, said disk having a displacer section for displacing the working fluid and a turbine section having turbine blades arranged along its periphery; and
    an output power shaft to which said disks are mounted for rotation within the chambers, wherein the disk in one chamber rotates out of phase with the disk in the other chamber and working fluid from the respective passages may be directed to the blades to rotate the disks within the chambers.

2. The engine of claim 1 wherein each chamber has a diskoidal-shaped housing and the hot and cold zones correspond to upper and lower hemispheres of the chambers.

3. The engine of claim 2 wherein the hot and cold zones of the chambers are established by passaging externally heated and cooled fluids to outside faces of the housings.

4. The engine of claim 2 wherein each housing has at least one inside face with projections.

5. The engine of claim 1 wherein each displacer section has an open-angle of at least 120 degrees.

6. The engine of claim 1 wherein the rotor disks are radially displaced relative to one another at a phase difference of about 180 degrees.

7. The engine of claim 1 wherein the passages have adjustable one-way flow valves and or adjustable nozzles.

8. The engine of claim 1 wherein the engine is adjustably connected to a reservoir of pressurized fluid.

9. The engine of claim 1 wherein the working fluid is a gas of high mass density and of low specific heat and viscosity.

10. The engine of claim 1 wherein the working fluid is either hydrogen bromide or silicon fluoride.

11. The engine claim 1 wherein each chamber has additional passages for communicating the working fluid between the hot zone and the cold zone of that chamber.

* * * * *